(12) United States Patent
Powers

(10) Patent No.: US 9,083,741 B2
(45) Date of Patent: Jul. 14, 2015

(54) NETWORK DEFENSE SYSTEM AND FRAMEWORK FOR DETECTING AND GEOLOCATING BOTNET CYBER ATTACKS

(71) Applicant: Architecture Technology Corporation, Minneapolis, MN (US)

(72) Inventor: Judson Powers, Ithaca, NY (US)

(73) Assignee: Architecture Technology Corporation, Minneapolis, MN (US)

( * ) Notice: Subject to any disclaimer, the term of this patent is extended or adjusted under 35 U.S.C. 154(b) by 0 days.

(21) Appl. No.: 13/730,706

(22) Filed: Dec. 28, 2012

(65) Prior Publication Data

US 2013/0174256 A1   Jul. 4, 2013

Related U.S. Application Data

(60) Provisional application No. 61/581,511, filed on Dec. 29, 2011.

(51) Int. Cl.
*H04L 29/06* (2006.01)

(52) U.S. Cl.
CPC .......... *H04L 63/145* (2013.01); *H04L 63/1416* (2013.01); *H04L 63/1425* (2013.01); *H04L 2463/144* (2013.01)

(58) Field of Classification Search
None
See application file for complete search history.

(56) References Cited

U.S. PATENT DOCUMENTS

| | | | | |
|---|---|---|---|---|
| 8,042,184 B1 * | 10/2011 | Batenin | | 726/24 |
| 8,296,820 B2 * | 10/2012 | Kao et al. | | 726/1 |
| 8,418,246 B2 * | 4/2013 | McConnell | | 726/22 |
| 8,776,241 B2 * | 7/2014 | Zaitsev | | 726/25 |
| 2002/0087882 A1 * | 7/2002 | Schneier et al. | | 713/201 |
| 2007/0139231 A1 * | 6/2007 | Wallia et al. | | 341/50 |
| 2009/0254989 A1 | 10/2009 | Achan et al. | | |
| 2010/0169476 A1 | 7/2010 | Chandrashekar et al. | | |
| 2011/0126136 A1 | 5/2011 | Abella et al. | | |
| 2011/0153811 A1 | 6/2011 | Jeong et al. | | |

(Continued)

OTHER PUBLICATIONS

Dagon, D, Zou, C, and Lee, W. Modeling Botnet Propagation Using Time Zones [online]. 2006 [Retrieved on Jun. 23, 2014]. College of Computing, Georgia Institute of Technology, and School of Computer Science, University of Central Florida. Retrieved from: CiteSeer.*

(Continued)

*Primary Examiner* — Benjamin Lanier
*Assistant Examiner* — Wayne An
(74) *Attorney, Agent, or Firm* — Shumaker & Sieffert, P.A.

(57) ABSTRACT

A network defense system is described that provides network sensor infrastructure and a framework for managing and executing advanced cyber security algorithms specialized for detecting highly-distributed, stealth network attacks. In one example, a system includes a data collection and storage subsystem that provides a central repository to store network traffic data received from sensors positioned within geographically separate networks. Cyber defense algorithms analyze the network traffic data and detect centrally-controlled malware that is configured to perform distributed network attacks ("botnet attacks") from devices within the geographically separate networks. A visualization and decision-making subsystem generates a user interface that presents an electronic map of geographic locations of source devices and target devices of the botnet attacks. The data collection and storage subsystem stores a manifest of parameters for the network traffic data to be analyzed by each of the cyber defense algorithms.

19 Claims, 3 Drawing Sheets

(56) References Cited

U.S. PATENT DOCUMENTS

2011/0154489 A1 6/2011 Jeong et al.
2013/0174259 A1* 7/2013 Pearcy et al. ............. 726/25

OTHER PUBLICATIONS

Mukosaka, S and Koike, H. Integrated Visualization System for Monitoring Security in Large-Scale Local Area Network [online]. Feb. 5-7, 2007 [Retrieved on Jun. 25, 2014]. Asia-Pacific Symposium on Visualization, and University of Electro-Communications. Retrieved from: IEEEXplore.*

Francois et al., "BotCloud: Detecting Botnets Using MapReduce," University of Luxembourg—Interdisciplinary Center for Security, Reliability and Trust 6 rue R. Coudenhove-Kalergi, L-1359 Luxembourg, Luxembourg, Jan. 10, 2012, 6 pp.

Zhao et al., "BotGraph: Large Scale Spamming Botnet Detection, " Northwestern University Microsoft Research Silicon Valley, Microsoft Corporation, Apr. 2009, 14 pp.

Gu et al., "BotMiner: Clustering Analysis of Network Traffic for Protocol- and Structure-Independent Botnet Detection," College of Computing, Georgia Institute of Technology, Damballa, Inc. Atlanta, GA 30308, USA, Proceedings of the 17th conference on Security symposium, 2008, pp. 139-154, 16 total pp.

Symantec Intelligence Report: Oct. 2012, 17pp.

Symantec DeepSight Threat Management System, https://tms.symantec.com/, Accessed Dec. 10, 2012, 1 pp.

"Botnets: Geographical Locations Of Attackers' IP Addresses," Symantec internet security threat report, vol. 17 May 2012, 1 pp.

V. Paxson: "Bro: A System for Detecting Network Intruders in Real-Time." Computer Networks, 31 (23-24), pp. 2435-2463, Dec. 1999.

M. Roesch: "Snort-lightweight intrusion detection for networks," Proceedings of LISA '00: 13th Systems Administration Conference, Nov. 7-12, 1999. 11 pp.

Sage A. Weil: "Ceph: Reliable, Scalable, and High-Performance Distributed Storage," Ph.D. thesis, University of California, Santa Cruz, Dec. 2007, and the Hadoop distributed file system from Apache Software, 239 pp.

M. Isard et al.: "Dryad: Distributed data-parallel programs from sequential building blocks," EuorSys, Mar. 2007, 14 pp.

J. Dean et al.: "MapReduce: Simplified data processing on large clusters," USENIX Symposium on OS Design and Implementation, 2004, 13 pp.

Yu et al: "SBOTMINER: Large Scale Search Bot Detection," International Conference on Web Search and Data Mining, Feb. 2010, 10 pp.

* cited by examiner

NETWORK DEFENSE SYSTEM AND FRAMEWORK FOR DETECTING AND GEOLOCATING BOTNET CYBER ATTACKS

This application claims the benefit under 35 U.S.C. 119(e) of U.S. Provisional Application No. 61/581,511, filed Dec. 29, 2011, the entire content of which is incorporated herein by reference.

TECHNICAL FIELD

The invention relates to computer networks and, more specifically, to network attacks.

BACKGROUND

Despite existing security efforts, computer networks are susceptible to attack and compromise. One type of network attack, referred to as a "botnet" attack, is an example of a highly distributed, stealth cyber-attack. A botnet is a large collection of computers on the Internet, usually infected with a particular piece of malware, that are used to perform large-scale, coordinated cyber attacks. Each member of the botnet (a malware infected node) receives and acts on instructions from a command-and-control system. These instructions may be to further propagate the botnet's malware, to scan websites for particular vulnerabilities, to perform denial of service attacks, or any other nefarious action on the Internet that is more effective when it is performed by hundreds or thousands of otherwise-innocent computers.

Botnets and other large-scale malicious behaviors present a pervasive and evolving threat to cyber security. Stealth botnets and distributed, stealthy cyber attacks present a particular challenge to cyber defense because their malicious behavior is difficult to detect. Botnets and botnet attacks are responsible for substantial economic damage and present a serious risk to critical Internet-connected systems. Distributed denial-of-service attacks can cause Internet services or Internet-connected networks to become unavailable. Many botnets are used to scan for security vulnerabilities in Internet services, such as websites, and Internet-connected computers.

Detecting and neutralizing botnets is an active area of security research. Many techniques to detect botnets and individual nodes participating in a botnet already exist. Some techniques for detecting botnets or a node's participation in an individual botnet are specific to a particular botnet; the techniques look for a particular piece of malware on the node, look for certain types of network traffic, or subvert the botnet's command and control system. More robust techniques apply pattern analysis to network traffic. These techniques analyze the pattern of network connections from one or many potential botnet nodes to differentiate "botnet-like" behavior from normal user behavior.

Stealth botnets present a particular challenge to cyber defense because their malicious behavior is distributed in time and space. A stealth botnet consists of many nodes, each of which acts infrequently. For example, perhaps the purpose of a botnet is to perform a denial-of-service attack on a website by flooding the website's server with connections. A conventional botnet would have each node make many connections to that server in quick succession. A stealth botnet would have each node connect to the server only infrequently, increasing the number of botnet nodes necessary to launch an attack but decreasing the likelihood that the botnet nodes will be detected. Detecting the actions of stealth botnets requires advanced algorithms and large volumes of data.

State-of-the-art and next-generation cyber security algorithms are being developed for detecting and preventing stealthy and distributed cyber attacks. Effectively using these algorithms, however, raises significant burdens and challenges on existing network infrastructure.

SUMMARY

In general, a network defense system is described that provides network sensor infrastructure and a framework for managing and executing advanced cyber security algorithms specialized for detecting highly-distributed, stealth network attacks. For example, a system is described that manages: (i) the collection and storage of filtered network traffic information from a large, distributed collection of network sensors, (ii) the application of computationally-intensive algorithms to the collected data, (iii) visualization and decision-making based on the results of these algorithms, and (iv) the alteration of network security policies in response to identified threats. As additional algorithms to detect new types of stealthy botnet attacks are implemented, the algorithms can rapidly be deployed within the system using the existing network of sensors, thereby quickly detecting, identifying, and defending against hostile stealth botnets and similar threats. As such, the system provides of a practical and scalable framework for future implementation of state-of-the-art cyber security algorithms.

As described, the system detects botnet attacks by gathering information from distributed sensors and is able to geolocate a worldwide source of active botnets attacking a specific target onto a dynamic world map. The system detects which types of such activities are likely to be malicious and which are likely to be legitimate user behavior, while minimizing as much as possible the presence of false positives and negatives. The system provides for a framework of seamless deployment of algorithms for the future detection of a potentially large and evolving family of highly distributed attacks (known or unknown today). The system provides a framework that allows for the implementation of state-of-the-art algorithms in a convenient, robust and scalable manner.

By solving the practical problems that prevent the large-scale application of state-of-the-art cyber defense algorithms to real-world networks and by advancing the state of the art in cyber defense visualization, the techniques described herein may improve the security of Internet-connected computer networks. For example, the described system enables users to detect distributed, stealth cyber attacks, visualize their geolocation on a world map, and create security policies to defend against these cyber attacks.

In one example, a system includes a data collection and storage subsystem configured to provide a central repository to store network traffic data received from a plurality of sensors positioned within geographically separate networks. The system further includes a computing cluster coupled to the data collection storage subsystem. The system further includes a set of software modules configured to execute a plurality of cyber defense algorithms on the computing cluster that analyze the network traffic data and detect centrally-controlled malware that is configured to perform distributed network attacks ("botnet attacks") from devices within the geographically separate networks. The system further includes a visualization and decision-making subsystem, operatively coupled to the data collection and storage subsystem, that generates a user interface that presents an electronic map of geographic locations of source devices and target devices of the botnet attacks within the networks. The data collection and storage subsystem is further configured to store a manifest of parameters for the network traffic data to be analyzed by each of the cyber defense algorithms.

In another example, a method includes receiving network traffic data with a centralized data collection and storage subsystem from a plurality of sensors positioned within geographically separately networks. The method further includes providing subsets of the network traffic data from the data collection and storage subsystem to a set of cyber defense algorithms executing on a computing cluster coupled to the data collection storage subsystem, as indicated by a manifest of parameters for the network traffic data to be analyzed by each of the cyber defense algorithms. The method further includes executing the set of cyber defense algorithms to analyze the network traffic data and detect centrally-controlled malware performing a distributed network attack ("botnet attack") from devices within the geographically separate networks. The method further includes generating a user interface with a visualization and decision-making subsystem to present an electronic map of geographic locations of source devices and target devices of the botnet attacks within the networks.

In another example, a computer-readable medium includes instructions for causing a programmable processor to receive network traffic data from a plurality of sensors positioned within geographically separately networks. The computer-readable medium further includes instructions for causing a programmable processor to store the network traffic data to a centralized data collection and storage subsystem. The computer-readable medium further includes instructions for causing a programmable processor to execute a set of cyber defense algorithms on a cluster of computing devices coupled to the data collection storage subsystem, wherein the cyber defense algorithms analyze the network traffic data and detect centrally-controlled, malware that is currently performing a distributed network attack ("botnet attack") from devices within the geographically separate networks. The computer-readable medium further includes instructions for causing a programmable processor to generate a user interface with a visualization and decision-making subsystem to present an electronic map of geographic locations of source devices and target devices of the botnet attacks within the networks.

In another example, a computing device is configured to implement a data collection and storage subsystem. The computing device includes one or more processors configured to execute a central repository to store network traffic data received from a plurality of sensors positioned within geographically separate networks. The one or more processors are configured to execute a set of software modules configured to execute a plurality of cyber defense algorithms on a computing cluster coupled to the computing device. The cyber defense algorithms analyze the network traffic data and detect centrally-controlled malware that is configured to perform distributed network attacks ("botnet attacks") from devices within the geographically separate networks. The one or more processors are configured to execute a visualization and decision-making subsystem, operatively coupled to the data collection and storage subsystem, that generates a user interface that presents an electronic map of geographic locations of source devices and target devices of the botnet attacks within the networks. The data collection and storage subsystem is further configured to store a manifest of parameters for the network traffic data to be analyzed by each of the cyber defense algorithms.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
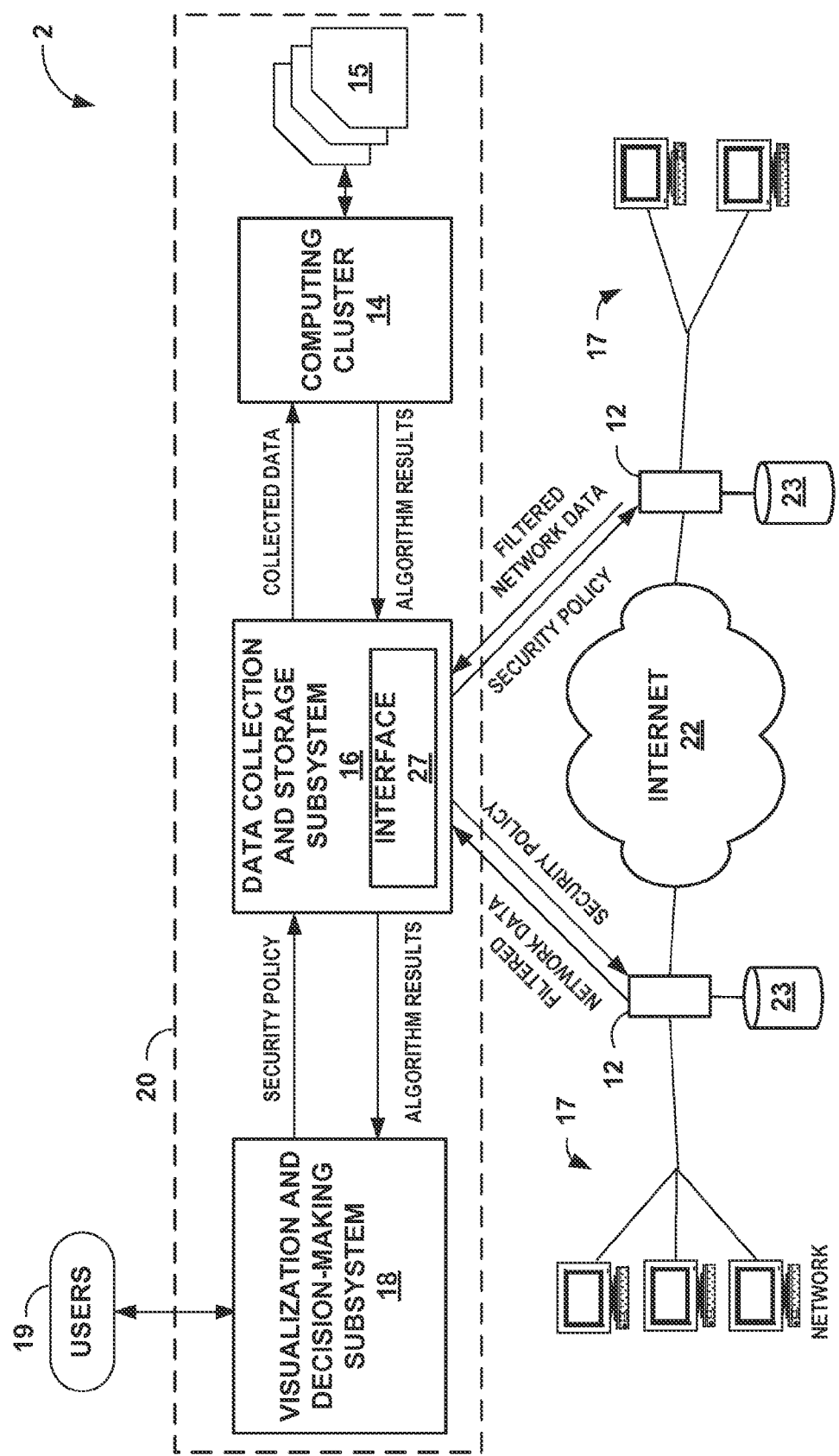
FIG. 1 is a block diagram illustrating a system that collects network traffic information using a network of sensors, stores the traffic data, detects malicious traffic patterns, and provides visualizations of the detection results.

FIG. 1 is a block diagram illustrating a system 2 that collects network traffic information using a network of sensors, collects and stores the traffic data, detects malicious traffic patterns, and provides visualizations of the detection results. System 2 provides a network sensor infrastructure of sensors 12 and a cyber security framework 20 for implementing and applying current and future cyber security algorithms. System 2 collects network traffic data from a fabric of network sensors 12, stores this data long-term, performs cyber security analysis on large quantities of data, creates visualizations of the analysis results (e.g., geographic location of botnet nodes), helps make security policy decisions, and enacts those decisions.

In the example of FIG. 1, system 2 includes four major components: network sensors 12, a computing cluster 14, data collection and storage subsystem 16, and visualization and decision-making subsystem 18. Sensors 12, located at Internet gateways, collect information about the network traffic between the Internet 22 and participating, geographically separate networks 17. The network traffic data collected by sensors 12 is uploaded to and stored by a centralized data collection and storage subsystem 16. Cyber defense algorithms 15, such as stealth botnet detectors, run on a computing cluster 14. Cyber defense algorithms 15 analyze the stored network traffic data to detect malicious patterns of network traffic. Visualization subsystem 18 helps decision-makers (users 19) interpret results of cyber defense algorithms 15, enabling them to view the type, origin, and target of a malicious behavior. Users 19 of system 2 are able to visualize on an electronic map the geographic locations of sources and targets of malicious network behavior. Security policy changes are made automatically by visualization and decision-making subsystem 18 or as a result of input from decision-makers 19 that may be input and propagated to the individual participating networks 17.

Network sensors 12 monitor and collect network traffic data for networks 17. System 2 may, for example, span the Unites States and encompass most or all major network carriers. As another example, system 2 may include major carrier networks from nations throughout the world. Each network sensor 12 may be located between a network 17 that participates in system 2 and the network's connection to the Internet 22. Each network sensor 12 may be a high-bandwidth sensor that monitors network traffic between its respective network 17 and the Internet 22, recording information about the monitored network traffic. Each network sensor 12 stores configurable recording and filtering rules 23 that enables filtering the recorded data so that only the data required for the later analysis is stored, thereby minimizing resource consumption. The recording and filtering rules 23 can be updated by the system 2, allowing new cyber defense algorithms 15 to be supported without requiring network administrators to manually reconfigure individual network sensors 12. In this way, the data collected by network sensors 12 is filtered to reduce storage and bandwidth requirements. Network sensors 12 may, in some examples, be based on low-cost commodity hardware and executing intrusion detection and network logging software to record and log communication streams and/or application-layer and protocol related transactions.

Each cyber defense algorithm 15 may require different features from the network traffic. Recorded network traffic is passed through a set of multiple filtering rules 23 that specify the aggregate set of features required by algorithms 15. The network sensor 12 then stores data that at least includes all features requested by algorithms 15. Since new cyber defense algorithms 15 may be routinely added to system 2, new filters can be created and automatically distributed to each participating network sensor 12. This allows system 2 to quickly start collecting data for a new cyber defense algorithm 15 without requiring individual network administrators to manually configure new data-collection mechanisms. A set of default generic filters may be used to ensure that basic network traffic data is collected, enabling new cyber defense algorithms 15 that use only this basic data to start performing analysis immediately.

System 2 addresses the limitations that currently prevent individual stealth botnet detection algorithms from being applied to actively protect real networks. Cyber defense algorithms 15 typically require large amounts of network traffic data, gathered over a long period of time from networks containing many hosts. The more networks 17 and hosts whose traffic is available for analysis, the more effectively one or more of algorithms 15 can detect malicious behaviors. Typically, many cyber defense algorithms may be used for research, so typically data may be gathered ad hoc from a small number of networks over a fixed time period. In contrast, various examples of system 2 of this disclosure may be permanent and may be used to continually and periodically receive network traffic data from a large number of participating networks 17. New or existing cyber defense algorithms 15 can be adapted to the framework 20 of system 2. Algorithms 15 can, therefore, access a wealth of collected network traffic data without the need to recruit participating networks and individually configure networks to collect and store the necessary network traffic data. System 2, in various examples of this disclosure, may overcome current limitations in gathering and analyzing network data with high-performance commodity network sensors 12 with filtering rules 23 to improve capacity and performance coupled with high-performance cluster systems for data storage, analysis, and visualization.

In one example, network sensors 12 execute intrusion detection software on commodity computing hardware. For example, intrusion detection systems (IDSs) may be used as components of network sensors. Example IDSs include "Bro" and "Snort" described by V. Paxson. "Bro: A System for Detecting Network Intruders in Real-Time." Computer Networks, 31 (23-24), pp. 2435-2463, December 1999) and M. Roesch. "Snort—lightweight intrusion detection for networks." In Proceedings of LISA '00: 13th Systems Administration Conference, 1999), incorporated herein by reference. These systems may run on commodity hardware and can configurably capture and log network traffic information from high-bandwidth Internet gateways for further analysis.

Centralized data collection and storage subsystem 16 collects and stores the recorded network traffic information, thereby acting as a central repository for system 2. Network sensors 12 periodically upload their recorded and filtered network traffic data to the collection and storage subsystem 16, which aggregates the data from network sensors 12 and stores the aggregated data for analysis in an organized database for analysis by cyber security algorithms 15. Since network traffic data is stored centrally, in collection and storage subsystem 16, individual network sensors 12 need not necessarily perform long-term storage. Data collection and storage subsystem 16 may automatically manage storage limitations, archiving or purging older or less-useful network traffic data as needed to make space for new data.

In this way, data collection and storage subsystem 16 provides long-term storage of collected network data and delivery of this data to the computing cluster 14. Network traffic data is uploaded from network sensors 12 to data collection and storage subsystem 16. Data collection and storage subsystem 16 accumulates, aggregates, and stores the data, potentially for months or years. When a cyber defense algorithm 15 is launched for execution, e.g., by automation software managing features of computing cluster 14, data collection and storage subsystem 16 extracts and delivers to the algorithm 15 an appropriate subset of the stored data. That is, data collection and storage subsystem 16 provides the particular network traffic having features required by the algorithm 15 that has been acquired over a particular time period. Data collection and storage subsystem 16 tracks and manages which cyber defense algorithms 15 are executed, which features each algorithm 15 requires, what data sets were provided to each of the algorithms 15, and the results of the analyses performed by each of the algorithms 15. This enables system 2 to provide a sliding window of network traffic data to the cyber defense algorithms 15. For example, a particular stealth botnet detection algorithm 15 might require three months of network traffic data in order to effectively detect botnets. This algorithm could then be scheduled to run once per week, each time providing it with network traffic data from the last three months. When stored network traffic data is so old that it is no longer used by any of the algorithms 15 installed within system 2, data collection and storage subsystem 16 may either archive or discard the data to free up storage space for new data.

Each of the cyber defense algorithms 15 may have an associated manifest of parameters that indicate or define particular subsets of network traffic data the particular algorithm requires for its analysis. The data collection and storage subsystem 16 may store these parameters in a combined manifest of parameters that indicate what kinds of data are required for analysis by each of the cyber defense algorithms 15. The data collection and storage subsystem 16 may store any network traffic data that might be needed by any of the cyber defense algorithms 15, as indicated by the manifest of such parameters. For example, one particular cyber defense algorithm 15 may require dates and times when certain network communications initiated and terminated, while another particular cyber defense algorithm 15 may require data in the form of the duration of certain network communications. These forms of data may be indicated in the manifest of parameters for each of the cyber defense algorithms 15. The data collection and storage subsystem 16 may compare the manifests of parameters indicating what form of data is required by each algorithm, identify where the data may be related by transformations, and store certain network traffic data in one form, and perform transformations on that data as needed to supply the data in another form to one of the algorithms 15. For example, the data collection and storage subsystem 16 may store dates and times of when certain network traffic data initiated and terminated, and transform this data to determine durations of time that the same network traffic data occurred, and supply this transformed data to one of the cyber defense algorithms 15 for which this form of the data is indicated in the algorithm's manifest of parameters.

As various cyber defense algorithms 15 are updated or new algorithms are introduced, data collection and storage subsystem 16 may maintain a combined manifest of parameters indicating what data each of the algorithms 15 requires and in what form, continue to supply the appropriate data to each of the algorithms 15, and collect the resulting analyses from algorithms 15 for presentation via visualization and decision-making subsystem 18. Data collection and storage subsystem 16 may therefore facilitate the management and operation of cyber security framework 20 as any number of cyber defense algorithms 15 are maintained or introduced.

The data collection and storage subsystem 16 may store network traffic data in any of a variety of forms of databases or data stores. The computing cluster 14 may also include a database, data store, or other resource for managing data being received from data collection and storage subsystem 16 and analyzed by cyber defense algorithms 15. The data collection and storage subsystem 16 may also receive, store, and aggregate data resulting from the analyses performed by cyber defense algorithms 15.

In some embodiments, data collection and storage subsystem 16 utilizes a cluster storage architecture, such as those used in cloud computing systems, to store the high volume of data that may be necessary to effectively apply state-of-the-art stealth botnet detection analysis algorithms 15. Moreover, execution of even individual ones of algorithm 15 may use a large quantity of data, and a high bandwidth transport may be used between data collection and storage subsystem 16 and computing cluster 14. Example cluster storage systems that support such high bandwidth requirements and that offer scalability and fault tolerance for storing large volumes of data while providing the benefits of centralized storage may include or be similar to systems such as "Ceph" described by Sage A. Weil, "Ceph: Reliable, Scalable, and High-Performance Distributed Storage," Ph.D. thesis, University of California, Santa Cruz, December, 2007, and the Hadoop™ distributed file system from Apache Software.

In some situations, one or more of sensors 12 may be located on respective networks 17 with limited bandwidth. By temporarily storing captured network traffic data on the network sensor 12 and only periodically uploading this data to the central repository of data collection and storage subsystem 16, the network sensor is able to perform data uploads during off-peak periods, when more bandwidth is typically available. When necessary, this synchronization process may reduce total bandwidth consumption by automatically dropping time slices of the captured set of features or by dropping features marked as less important. For example, network features may be ranked according to how many algorithms require the feature and the ranking of those algorithms relative to each other. Network traffic features that are only used by a single, non-critical one of cyber defense algorithms 15 might be discarded automatically discarded by a sensor 12 in the event the bandwidth available to transfer network traffic data to storage subsystem 16 is limited. Since recorded network traffic may contain potentially-sensitive information, the data synchronization process may use appropriate security and cryptographic measures to minimize the risk of network traffic data being read, intercepted or modified by third parties.

Cyber defense algorithms 15 may execute on a computing cluster 14 that provides an automation environment for invoking and executing algorithms 15. Computing cluster 14 may be implemented as a high-performance computing (HPC) cluster. Algorithms 15 running on computing cluster 14 operate on high volumes of network traffic data from the collection and storage subsystem 16 and execute on computing cluster 14 to perform analysis in a timely fashion. The results of algorithms 15, including information about detected patterns of malicious behavior, are stored in the data collection and storage subsystem 16. Computing cluster 14 may use an HPC framework, enabling a wide variety of current and future cyber defense algorithms to be easily integrated into system 2. For example, algorithms 15 may be written for a cluster computer or distributed computing framework, and may be translated from one framework to another for deployment within system 2. In some examples, computing cluster 14 of system 2 may comprise different clusters executing different HPC frameworks, or may comprise a single cluster running multiple HPC frameworks. Example HPC frameworks are described by M. Isard, M. Budiu, Y. Yu, A. Birrell, and D. Fetterly, "Dryad: Distributed data-parallel programs from sequential building blocks," EuroSys, 2007 and J. Dean and S. Ghemawat, "MapReduce: Simplified data processing on large clusters," USENIX Symposium on OS Design and Implementation, 2004, the contents of each being incorporated herein by reference. In various examples, computing cluster 14 may be implemented in any appropriate computing system capable of executing algorithms 15. Computing cluster 14, or one or more high-performance computing frameworks included in computing cluster 14, may each be implemented with one or more computing devices.

Example state-of-the-art stealth botnet detection algorithms suitable for deployment within HPC frameworks are described by F. Yu, Y. Xie, and Q. Ke, "SBotMiner: Large Scale Search Bot Detection," International Conference on Web Search and Data Mining, February 2010; G. Gu, R. Perdeisci, J. Zhang, and W. Lee, "BotMiner: Clustering Analysis of Network Traffic for Protocol- and Structure-Independent Botnet Detection," Proceedings of the 17th Conference on Security Symposium, 2008; and Y. Zhao, Y. Xie, F. Yu, Q. Ke, Y. Yu, Y. Chen, and E. Gillum, "BotGraph: Large Scale Spamming Botnet Detection," USENIX Symposium on Networked Systems Design and Implementation, April 2009, the contents of each being incorporated herein by reference.

Results from cyber security algorithms 15 may be interpreted using visualization subsystem 18. In one embodiment, visualization system 18 may enable users 19 to view both low-level details and high-level summaries of malicious behavior detected by one or more cyber defense algorithms 15. Visualization system 18 may enable users 19 to rapidly access information necessary to assess and improve network security, such as the frequency of different types of malicious behavior. In one example, visualization system 18 constructs and presents, accessibly to users 19, a map of the geographic locations of sources and targets of malicious network behavior. In this way, visualization system 18 provides for visualizing the results from multiple cyber defense algorithms. Visualization system 18 provides users 19 with the ability to view on a map the origins and targets of stealth botnet attacks and other malicious behavior. That is, effectively protecting against malicious network behavior may require decision-makers 19 to be able to visualize and interpret the information necessary to set network policies, such as blocking traffic of a particular type or from a particular location. System 2 enables decision-makers 19 to monitor and improve network security by providing useful visualizations of the results of cyber defense algorithms 15. Network administrators, for example, are able to view how many and which hosts in their respective networks 17 are participating in botnets, which is an indicator that those hosts are probably compromised by malware. Administrators are also able to view which networks 17 and servers are being targeted by stealth botnet attacks and other detected malicious behaviors.

Visualization system 18 may use Internet Protocol (IP) geolocation to determine the approximate physical location of network hosts for constructing a map of the geographic distribution of botnets and their targets. Depending on the botnet detection algorithm used, visualization system 18 maps the locations of botnet participants and/or command-and-control channels. Visualization system 18 also enables users 19 to visualize both the nature of the malicious traffic and how the distribution and intensity of malicious traffic changes over time. These visualizations may be useful in creating network security policies to protect against the malicious traffic. These visualizations may also be useful to researchers, who may use the visualizations to understand the nature of botnets and to aid in developing future cyber defense algorithms.

Data collection and storage subsystem 16 provides an interface 27 for conveying security policy decisions (e.g., traffic filters) to the individual networks 17 participating in system 2. In addition to security policies created using the visualization tools of visualization system 18, algorithmic-specific security policies may be generated automatically from cyber defense algorithms 15 run by computing cluster 14. For example, a particular botnet detection algorithm with a very low false positive rate could be authorized to automatically generate policies to block network traffic from individual hosts. Network security policies, such as blocking traffic from a particular host or blocking HTTP requests matching a specific pattern, that are generated by cyber defense algorithms 15, may be propagated to participating networks 17 via data collection and storage subsystem 16.

This propagation may be done through a number of channels. Many security policies may be implemented automatically on a network sensor 12 itself, either using the intrusion detection system or using additional software on the network sensor. Other security policies may be sent to the network administrator or specified network hosts (e.g., a router or the network administrator's computer) in both human- and machine-readable formats so that security policies can be implemented on network-specific security hardware and software. These machine-readable formats can be customized for common hardware or software so that, for example, firewall hardware used by a majority of participating networks 17 can be updated with new security policy rules with minimal human intervention. Network administrators of participating networks 17 may be able to configure whether their network contributes network traffic data to system 2, receives automatic security policy information from the system 2, or both. Likewise, administrators can configure whether participating networks 17 are permitted to contribute data or receive security policy information. System 2 may use security and cryptographic protocols to minimize the risk of unauthorized parties obtaining or subverting security policy information.

By solving the practical problems that limit the real-world usefulness of state-of-the-art cyber defense algorithms and advancing the state of the art in cyber defense visualization, system 2 may benefit both network administrators and cyber security researchers and improve the security of participating networks and the Internet as a whole. Cyber security researchers may benefit from rapid access to network traffic data for developing new cyber defense algorithms. Network administrators may benefit by receiving information about which hosts on their networks are participating in or are targeted by malicious network traffic, and may be able to use this information to protect their networks from future threats.

Figure 2:
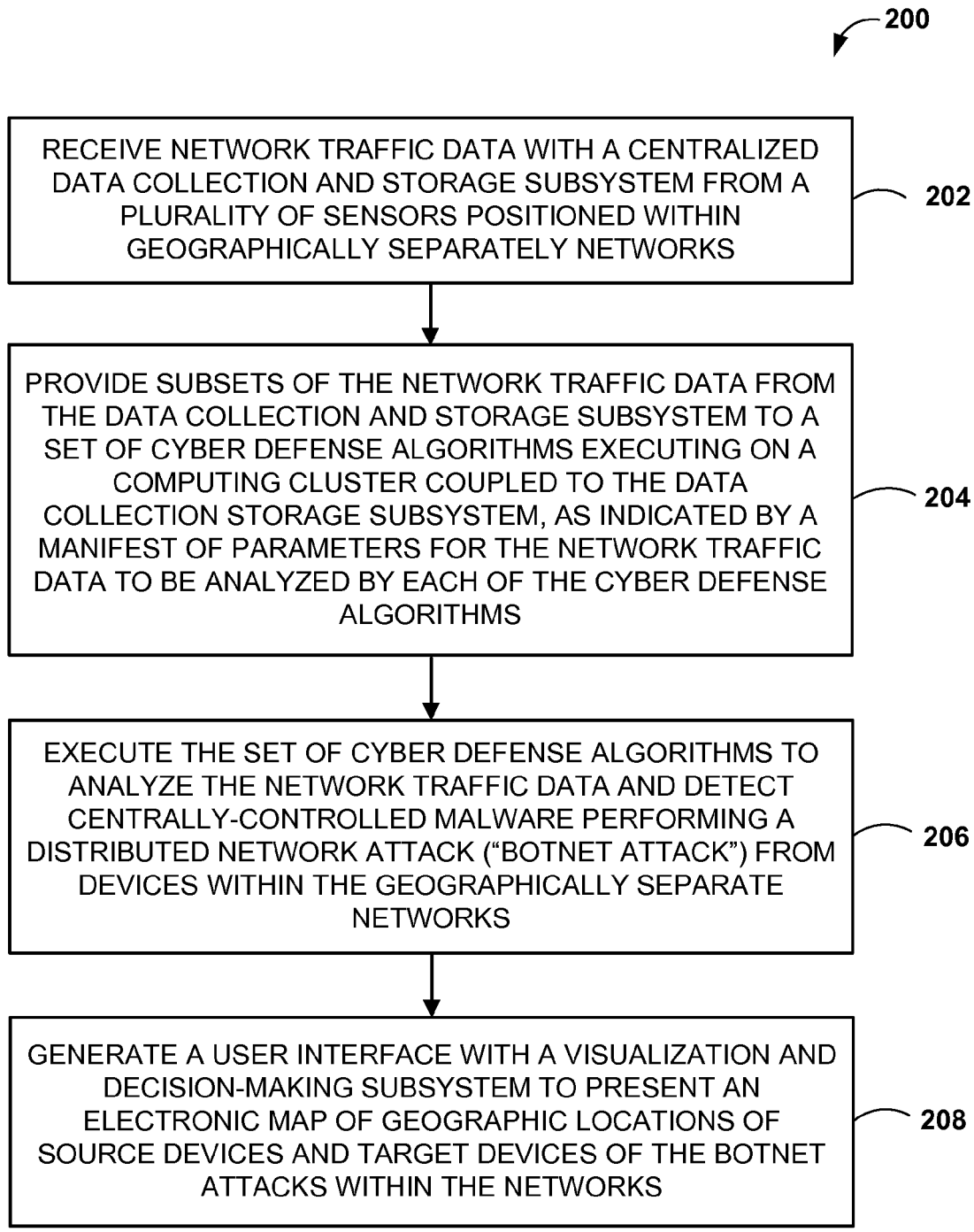
FIG. 2 is a flowchart illustrating operation of an example method for collecting network traffic information using a network of sensors, storing the traffic data, detecting malicious traffic patterns, and providing visualizations of the detection results.

FIG. 2 is a flowchart illustrating operation of an example method 200, such as may be performed using data collection and storage subsystem 16, for collecting network traffic information using a network of sensors, storing the traffic data, detecting malicious traffic patterns, and providing visualizations of the detection results. As shown in the example method 200 of FIG. 2, making reference to elements shown in the example of FIG. 1, a computing device, such as one or more computing devices used for implementing data collection and storage subsystem 16, may receive network traffic data with a centralized data collection and storage subsystem, such as data collection and storage subsystem 16 from a plurality of sensors positioned within geographically separately networks, such as sensors 12 (202). For example, the sensors 12 positioned within geographically separately networks may monitor network traffic and generate the network traffic data. Method 200 further includes providing subsets of the network traffic data from the data collection and storage subsystem 16 to a set of cyber defense algorithms 15 executing on a computing cluster 14 coupled to the data collection storage subsystem 16, as indicated by a manifest of parameters for the network traffic data to be analyzed by each of the cyber defense algorithms (204). Method 200 further includes executing the set of cyber defense algorithms 15 to analyze the network traffic data and detect centrally-controlled malware performing a distributed network attack ("botnet attack") from devices within the geographically separate networks 17 (206). Method 200 further includes generating a user interface with a visualization and decision-making subsystem 18 to present an electronic map of geographic locations of source devices and target devices of the botnet attacks within the networks 17 (208).

Figure 3:
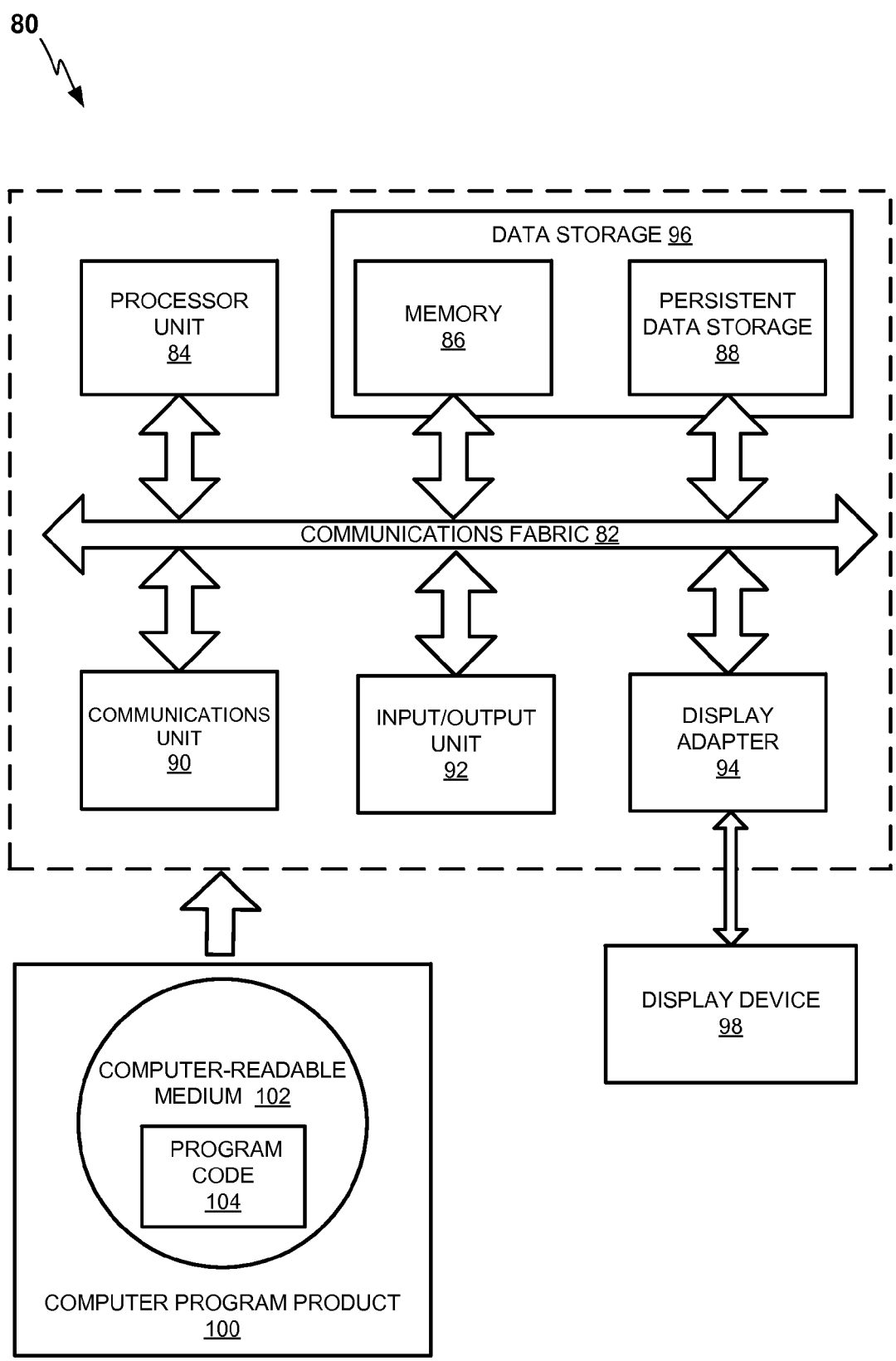
FIG. 3 is a block diagram of an example computing device that may be used for implementing a data collection and storage subsystem for storing and managing network traffic data for analysis by a plurality of cyber defense algorithms.

FIG. 3 is a block diagram of an example computing device 80 that may be used for implementing a data collection and storage subsystem 16 for storing and managing network traffic data for analysis by a plurality of cyber defense algorithms 15. Computing device 80 may be a workstation, server, mainframe computer, notebook or laptop computer, desktop computer, tablet, smartphone, or other programmable data processing apparatus of any kind Any combination or all of the processes and capabilities disclosed herein may execute on computing device 80 or a combination of similar computing devices that may be implemented in one or more real or virtual servers, a data center, a cloud data service with multiple redundant data centers, or in any other configuration. Other possibilities for computing device 80 are possible, including a computer having capabilities or formats other than or beyond those described herein.

In this illustrative example, computing device 80 includes communications fabric 82, which provides communications between processor unit 84, memory 86, persistent data storage 88, communications unit 90, and input/output (I/O) unit 92. Communications fabric 82 may include a dedicated system bus, a general system bus, multiple buses arranged in hierarchical form, any other type of bus, bus network, switch fabric, or other interconnection technology. Communications fabric 82 supports transfer of data, commands, and other information between various subsystems of computing device 80.

Processor unit 84 may be a programmable central processing unit (CPU) configured for executing programmed instructions stored in memory 86. In another illustrative example, processor unit 84 may be implemented using one or more heterogeneous processor systems in which a main processor is present with secondary processors on a single chip. In yet another illustrative example, processor unit 84 may be a symmetric multi-processor system containing multiple processors of the same type. In various examples, processor unit 84 may include a multi-core processor, such as a dual core, quad core, or other multiple core processor, for example. Processor unit 84 may include multiple processing chips on one die, and/or multiple dies on one package or substrate, for example. Processor unit 84 may also include one or more levels of integrated cache memory, for example. In various examples, processor unit 84 may comprise one or more CPUs distributed across one or more locations.

Data storage 96 includes memory 86 and persistent data storage 88, which are in communication with processor unit 84 through communications fabric 82. Memory 86 can include a random access semiconductor memory (RAM) for storing application data, i.e., computer program data, for processing. While memory 86 is depicted conceptually as a single monolithic entity, in various examples, memory 86 may be arranged in a hierarchy of caches and in other memory devices, in a single physical location, or distributed across a plurality of physical systems in various forms. While memory 86 is depicted physically separated from processor unit 84 and other elements of computing device 80, memory 86 may refer equivalently to any intermediate or cache memory at any location throughout computing device 80, including cache memory proximate to or integrated with processor unit 84 or individual cores of processor unit 84.

Persistent data storage 88 may include one or more hard disc drives, solid state drives, flash drives, rewritable optical disc drives, magnetic tape drives, or any combination of these or other data storage media. Persistent data storage 88 may store computer-executable instructions or computer-readable program code for an operating system, application files comprising program code, data structures or data files, and any other type of data. These computer-executable instructions may be loaded from persistent data storage 88 into memory 86 to be read and executed by processor unit 84 or other processors. Data storage 96 may also include any other hardware elements capable of storing information, such as, for example and without limitation, data, program code in functional form, and/or other suitable information, either on a temporary basis and/or a permanent basis.

Persistent data storage 88 and memory 86 are examples of physical, tangible, non-transitory computer-readable data storage devices. Data storage 96 may include any of various forms of volatile memory that may require being periodically electrically refreshed to maintain data in memory, while persons skilled in the art will recognize that this also constitutes an example of a physical, tangible, non-transitory computer-readable data storage device. Executable instructions are stored on a non-transitory medium when program code is loaded, stored, relayed, buffered, or cached on a non-transitory physical medium or device, including if for only a short duration or only in a volatile memory format.

Processor unit 84 can also be suitably programmed to read, load, and execute computer-executable instructions or computer-readable program code for a data collection and storage subsystem 16, as described in greater detail above, as well as for computing cluster 14, visualization and decision-making subsystem 18, or other elements of system 2. This program code may be stored on memory 86, persistent data storage 88, or elsewhere in computing device 80. This program code may also take the form of program code 104 stored on computer-readable medium 102 comprised in computer program product 100, and may be transferred or communicated, through any of a variety of local or remote means, from computer program product 100 to computing device 80 to be enabled to be executed by processor unit 84, as further explained below.

The operating system may provide functions such as device interface management, memory management, and multiple task management, and may be implemented as any suitable operating system. Processor unit 84 can be suitably programmed to read, load, and execute instructions of the operating system.

Communications unit 90, in this example, provides for communications with other computing or communications systems or devices. Communications unit 90 may provide communications through the use of physical and/or wireless communications links. Communications unit 90 may include a network interface card for interfacing with a LAN 16, an Ethernet adapter, a Token Ring adapter, a modem for connecting to a transmission system such as a telephone line, or any other type of communication interface. Communications unit 90 can be used for operationally connecting many types of peripheral computing devices to computing device 80, such as printers, bus adapters, and other computers. Communications unit 90 may be implemented as an expansion card or be built into a motherboard, for example.

The input/output unit 92 can support devices suited for input and output of data with other devices that may be connected to computing device 80, such as keyboard, a mouse or other pointer, a touchscreen interface, an interface for a printer or any other peripheral device, a removable magnetic or optical disc drive (including CD-ROM, DVD-ROM, or Blu-Ray), a universal serial bus (USB) receptacle, or any other type of input and/or output device. Input/output unit 92 may also include any type of interface for video output in any type of video output protocol and any type of monitor or other video display technology, in various examples. Some of these examples may overlap with each other, or with example components of communications unit 90 or data storage 96. Input/output unit 92 may also include appropriate device drivers for any type of external device, or such device drivers may reside in the operating system or elsewhere on computing device 80 as appropriate.

Computing device 80 also includes a display adapter 94 in this illustrative example, which provides one or more connections for one or more display devices, such as display device 98, which may include any of a variety of types of display devices. Display adapter 94 may include one or more video cards, one or more graphics processing units (GPUs), one or more video-capable connection ports, or any other type of data connector capable of communicating video data, in various examples. Display device 98 may be any kind of video display device, such as a monitor, a television, or a projector, in various examples.

Input/output unit 92 may include a drive, socket, or outlet for receiving computer program product 100, which comprises a computer-readable medium 102 having computer program code 104 stored thereon. For example, computer program product 100 may be a CD-ROM, a DVD-ROM, a Blu-Ray disc, a magnetic disc, a USB stick, a flash drive, or an external hard disc drive, as illustrative examples, or any other suitable data storage technology. Computer program code 104 may include a computer program, module, or portion of code for processing an application model to generate application model build artifacts in a vendor computing environment or performing any other actions as described above.

Computer-readable medium 102 may include any type of optical, magnetic, or other physical medium that physically encodes program code 104 as a binary series of different physical states in each unit of memory that, when read by computing device 80, induces a physical signal that is read by processor 84 that corresponds to the physical states of the basic data storage elements of storage medium 102, and that induces corresponding changes in the physical state of processor unit 84. That physical program code signal may be written, modeled, or conceptualized as computer-readable instructions at any of various levels of abstraction, such as a high-level programming language, assembly language, or machine language, but ultimately constitutes or causes a series of physical electrical and/or magnetic interactions that physically induce a change in the physical state of processor unit 84, thereby physically causing processor unit 84 to generate physical outputs that correspond to the computer-executable instructions, in a way that modifies computing device 80 into a new physical state and causes computing device 80 to physically assume new capabilities that it did not have until its physical state was changed by loading the executable instructions comprised in program code 104.

In some illustrative examples, program code 104 may be downloaded over a network to data storage 96 from another device or computer system, such as a server, for use within computing device 80. Program code 104 comprising computer-executable instructions may be communicated or transferred to computing device 80 from computer-readable medium 102 through a hard-line or wireless communications link to communications unit 90 and/or through a connection to input/output unit 92. Computer-readable medium 102 comprising program code 104 may be located at a separate or remote location from computing device 80, and may be located anywhere, including at any remote geographical location anywhere in the world, and may relay program code 104 to computing device 80 over any type of one or more communication links, such as the Internet and/or other packet data networks. The program code 104 may be transmitted over a wireless Internet connection, or over a shorter-range direct wireless connection such as wireless LAN, Bluetooth™, Wi-Fi™, or an infrared connection, for example. Any other wireless or remote communication protocol may also be used in other implementations.

The communications link and/or the connection may include wired and/or wireless connections in various illustrative examples, and program code 104 may be transmitted from a source computer-readable medium 102 over non-tangible media, such as communications links or wireless transmissions containing the program code 104. Program code 104 may be more or less temporarily or durably stored on any number of intermediate tangible, physical computer-readable devices and media, such as any number of physical buffers, caches, main memory, or data storage components of servers, gateways, network nodes, mobility management entities, or other network assets, en route from its original source medium to computing device 80.

Computing device 80 of FIG. 3 may be an implementation of all or part of data collection and storage subsystem 16 of FIG. 1. In FIG. 1, communicative connections among data collection and storage subsystem 16, computing cluster 14, visualization and decision-making subsystem 18, sensors 12, and other elements may include one or more networks of any kind that may provide communications links between various devices and computers connected together within framework 20 and/or system 2 in general. Communicative connections in system 2 may include connections, such as wire, wireless communication links, or fiber optic cables. In one example, communicative connections in system 2 may include the Internet with a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Communicative connections in system 2 may also be implemented as a number of different types of networks, such as for example, an intranet, a local area network (LAN), or a wide area network (WAN). FIG. 1 is an illustrative example, and not an architectural limitation for the variety of illustrative examples.

As persons skilled in the art will appreciate, aspects of the present invention may be embodied as a method, a computing system, or a computer program product, for example. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, aspects of the present disclosure may take the form of a computer program product embodied in one or more computer-readable data storage devices or computer-readable data storage components that include computer-readable medium(s) having computer readable program code embodied thereon. For example, a computer-readable data storage device may be embodied as a tangible device that may include a tangible, non-transitory data storage medium, as well as a controller configured for receiving instructions from a resource such as a central processing unit (CPU) to retrieve information stored at one or more particular addresses in the tangible, non-transitory data storage medium, and for retrieving and providing the information stored at those particular one or more addresses in the data storage medium.

The data storage device may store information that encodes both instructions and data, for example, and may retrieve and communicate information encoding instructions and/or data to other resources such as a CPU, for example. The data storage device may take the form of a main memory component such as a hard disc drive or a flash drive in various embodiments, for example. The data storage device may also take the form of another memory component such as a RAM integrated circuit or a buffer or a local cache in any of a variety of forms, in various embodiments. This may include a cache integrated with a controller, a cache integrated with a graphics processing unit (GPU), a cache integrated with a system bus, a cache integrated with a multi-chip die, a cache integrated within a CPU, or the processor registers within a CPU, as various illustrative examples. The data storage apparatus or data storage system may also take a distributed form such as a redundant array of independent discs (RAID) system or a cloud-based data storage service, and still be considered to be a data storage component or data storage system as a part of or a component of an embodiment of a system of the present disclosure, in various embodiments.

Program code embodied on a computer readable medium may be transmitted using any appropriate medium, including but not limited to radio frequency (RF) or other wireless, wireline, optical fiber cable, etc., or any suitable combination of the foregoing. Computer program code for carrying out operations for aspects of the present invention may be written in any combination of one or more programming languages, such as Java, C, C++, Python, or any other language. One or more portions of applicable program code may execute partly or entirely on a user's desktop or laptop computer, smartphone, tablet, or other computing device; as a stand-alone software package, partly on the user's computing device and partly on a remote computing device; or entirely on one or more remote servers or other computing devices, among various examples. In the latter scenario, the remote computing device may be connected to the user's computing device through any type of network, including a local area network (LAN) or a wide area network (WAN), or the connection may be made to an external computer (for example, through a public network such as the Internet using an Internet Service Provider), and for which a virtual private network (VPN) may also optionally be used.

In various illustrative embodiments, various computer programs, software applications, modules, or other software elements may be executed in connection with one or more user interfaces being executed on a client computing device, that may also interact with one or more web server applications that may be running on one or more servers or other separate computing devices and may be executing or accessing other computer programs, software applications, modules, databases, data stores, or other software elements or data structures.

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided as computer-executable code to a processor of a general purpose computer, special purpose computer, or other programmable data processing apparatus to produce a machine, such that the instructions, which execute via the processor of the computer or other programmable data processing apparatus, may create means for implementing the functions or acts specified in the flowchart and/or block diagram block or blocks.

These computer program instructions may also be stored in a computer readable medium that can cause a computer, other programmable data processing apparatus, or other devices to function in a particular manner, such that the executable instructions stored in the computer readable medium transform the computing device into an article of manufacture that embodies or implements the functions or acts specified in the flowchart and/or block diagram block or blocks. The computer program instructions may also be loaded onto a computer, other programmable data processing apparatus, or other devices to cause a series of operational steps to be performed on the computer, other programmable apparatus or other devices, to produce a computer implemented process such that the instructions which execute on the computer or other programmable apparatus provide or embody processes for implementing the functions or acts specified in the flowchart and/or block diagram block or blocks.

In general, the techniques described herein may be implemented in hardware, software, firmware, or any combination thereof. Any features described as modules or components may be implemented together in an integrated logic device or separately as discrete but interoperable logic devices. If implemented in software, the techniques may be realized at least in part by a non-transitory computer-readable medium to store instructions that, when executed, performs one or more of the methods described above. The computer-readable medium may form part of a computer program product, which may include packaging materials. The computer-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The program code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structures or any other structure suitable for implementation of the techniques described herein, including one or more hardware-based microprocessors.

The description of the present disclosure has been presented for purposes of illustration and description, and is not intended to be exhaustive or limited to the disclosure in the form disclosed. Many modifications and variations will be understood by persons of ordinary skill in the art based on the concepts disclosed herein. The particular examples described were chosen and disclosed in order to explain the principles of the disclosure and example practical applications, and to enable persons of ordinary skill in the art to understand the disclosure for various embodiments with various modifications as are suited to the particular use contemplated. The various examples described herein and other embodiments are within the scope of the following claims.

The invention claimed is:

1. A system comprising:
   a data collection and storage subsystem configured to provide a central repository to store network traffic data received from a plurality of sensors positioned within geographically separate networks;
   a computing cluster comprising at least one computing device, the computing cluster being coupled to the data collection storage subsystem;
   a set of software modules configured to execute a plurality of cyber defense algorithms on the computing cluster that analyze the network traffic data and detect, based on the analysis of the network traffic data, centrally-controlled malware that is configured to perform distributed network attacks ("botnet attacks") from devices within the geographically separate networks; and
   a visualization and decision-making subsystem, operatively coupled to the data collection and storage subsystem, that generates a user interface that presents an electronic map of geographic locations of source devices and target devices of the botnet attacks within the geographically separate networks;
   wherein the data collection and storage subsystem is further configured to manage a plurality of features for the network traffic data to be analyzed by the cyber defense algorithms,
   wherein, based on the plurality of features, the data collection and storage subsystem is configured to a) determine subsets of the network traffic data to be analyzed by respective ones of the cyber defense algorithms, b) extract the subsets of the network traffic data stored in the data collection and storage subsystem, c) determine which ones of the extracted subsets of the network traffic data are to be provided to the respective ones of the cyber defense algorithms during execution on the at least one computing device, and d) deliver each of the extracted subsets of the network traffic data to the at least one computing device, such that, during execution of the cyber defense algorithms, the at least one computing device provides the extracted subsets of the network traffic data to the respective ones of the cyber defense algorithms for analysis, and wherein at least one of the plurality of cyber defense algorithms is configured to automatically generate network security policies and propagate the network security policies to at least one of the geographically separate networks.

2. The system of claim 1, wherein the data collection and storage subsystem provides a set of recording and filtering rules to the plurality of sensors for filtering the network traffic data prior to communication to the data collection and storage subsystem.

3. The system of claim 2, wherein the set of recording and filtering rules specify an aggregate set of network traffic features as indicated by the plurality of features for the network traffic data to be analyzed by the cyber defense algorithms.

4. The system of claim 1, further comprising:
automation software to repeatedly execute the cyber defense algorithms on the computing cluster,
wherein the data collection and storage subsystem periodically receives updates of the network data traffic from the plurality of sensors, and
wherein the data collection and storage subsystem provides a sliding window of the network traffic data to the cyber defense algorithms executing on the computing cluster as indicated by the plurality of features for the network traffic data to be analyzed by the cyber defense algorithms.

5. The system of claim 1, wherein the visualization and decision-making subsystem presents high-level summaries of malicious behavior detected by the one or more cyber defense algorithms.

6. The system of claim 1, wherein the data collection and storage subsystem provides an interface for communicating security policies to the plurality of sensors deployed within the geographically separate networks.

7. The system of claim 1, wherein the plurality of sensors are configured to monitor network traffic and generate network traffic data.

8. The system of claim 1, wherein the data collection and storage subsystem comprises a database for storing the network traffic data.

9. The system of claim 1, wherein the data collection and storage subsystem is further configured to perform one or more transformations on the subsets of the network traffic data extracted from the database to deliver the extracted subsets of the network traffic data to the at least one computing device, wherein during execution of the cyber defense algorithms, the at least one computing device provides the extracted subsets of the network traffic data to the respective ones of the cyber defense algorithms in forms required by the respective ones of the cyber defense algorithms as indicated by the plurality of features.

10. The system of claim 1, wherein the data collection and storage subsystem is further configured to:
receive corresponding results of analyses of the respective extracted subsets of the network traffic data performed by the respective ones of the cyber defense algorithms.

11. The system of claim 1, wherein, based on the plurality of features, the data collection and storage subsystem is further configured to: a) determine a first subset of the network traffic data to be analyzed by a first cyber defense algorithm of the plurality of cyber defense algorithms and to determine a second subset of the network traffic data to be analyzed by a second cyber defense algorithm of the plurality of cyber defense algorithms, b) extract the first and second subsets of the network traffic data, algorithms, extract second subset of the network traffic data based on the plurality of features required by a second cyber defense algorithm of the plurality of cyber defense algorithms, c) determine that the first cyber defense algorithm will receive the first subset of the network traffic data and that the second cyber defense algorithm will receive the second subset of the network traffic data, and d) deliver the first and second extracted subsets of the network traffic data to the at least one computing device, wherein, during execution of the cyber defense algorithms, the at least one computing device provides the first extracted subset of the network traffic data to the first cyber defense algorithm, wherein, during execution of the cyber defense algorithms, the at least one computing device provides the second extracted subset of the network traffic data to the second cyber defense algorithm, wherein the first cyber defense algorithm is configured to analyze the first extracted subset of the network traffic data, wherein the second cyber defense algorithm is configured to analyze the second extracted subset of the network traffic data, and wherein the data collection and storage subsystem is further configured to receive, from the at least one computing device, a first set of analysis results performed by the first cyber defense algorithm based on the analysis of the first extracted subset of the network traffic data, and to receive, from the at least one computing device, a second set of analysis results performed by the second cyber defense algorithm based on the analysis of the second extracted subset of the network traffic data.

12. A method comprising:
receiving network traffic data with a centralized data collection and storage subsystem from a plurality of sensors positioned within geographically separately networks;
determining, based on a plurality of features for the network traffic, subsets of the network traffic data to be analyzed by respective ones of a set of cyber defense algorithms;
extracting the subsets of the network traffic data stored in the data collection and storage subsystem;
determining, based on the plurality of features for the network traffic data, which ones of the extracted subsets of network traffic data are to be provided to the respective ones of the cyber defense algorithms during execution on at least one computing device of a computing cluster, the computing cluster being coupled to the data collection and storage subsystem;
delivering each of the extracted subsets of the network traffic data to the at least one computing device, such that, during execution of the set of cyber defense algorithms on the at least one computing device, the at least one computing device provides the extracted subsets of the network traffic data to the respective ones of the cyber defense algorithms;

receiving an analysis of the network traffic data based upon analyses of the respective extracted subsets of the network traffic data performed by the respective ones of the cyber defense algorithms;

detecting, based on the analysis of the network traffic data, centrally-controlled malware performing at least one distributed network attack ("botnet attack") from devices within the geographically separate networks;

generating a user interface with a visualization and decision-making subsystem to present an electronic map of geographic locations of source devices and target devices of the at least one botnet attack within the geographically separate networks;

automatically generating, by at least one of the set of cyber defense algorithms, network security policies; and propagating the network security policies to at least one of the geographically separate networks.

13. The method of claim 12, further comprising:

providing a set of recording and filtering rules to the plurality of sensors for filtering the network traffic data prior to communication to the data collection and storage subsystem wherein the set of recording and filtering rules specify an aggregate set of network traffic features as indicated by the plurality of features for the network traffic data to be analyzed by the cyber defense algorithms.

14. The method of claim 12, further comprising:

periodically receiving updated network traffic data from the plurality of sensors with the data collection and storage subsystem; and repeatedly executing the cyber defense algorithms on the cluster of computing devices with automation software, where repeatedly executing the cyber defense algorithms includes providing a sliding window of the network traffic data to the cyber defense algorithms executing on the cluster of computing devices, as indicated by the plurality of features for the network traffic data to be analyzed by the cyber defense algorithms.

15. The method of claim 12, further comprising:

presenting, with the visualization and decision-making subsystem, high-level summaries of malicious behavior detected by the one or more cyber defense algorithms.

16. The method of claim 12, further comprising:

monitoring network traffic and generating network traffic data with the plurality of sensors.

17. The method of claim 12, the method further comprising:

storing the network traffic data in a database.

18. The method of claim 12, further comprising:

performing one or more transformations on the subsets of the network traffic data extracted from the database to deliver the extracted subsets of the network traffic data to the at least one computing device, wherein during execution of the set of cyber defense algorithms, the at least one computing device provides the extracted subsets of the network traffic data to the respective ones of the cyber defense algorithms in forms required by the respective ones of the cyber defense algorithms as indicated by the plurality of features.

19. A non-transitory computer-readable medium comprising instructions for causing at least one programmable processor to:

receive network traffic data from a plurality of sensors positioned within geographically separately networks;

store the network traffic data to a centralized data collection and storage subsystem;

determine, based on a plurality of features for the network traffic data, subsets of the network traffic data to be analyzed by respective ones of a set of cyber defense algorithms;

extract the subsets of the network traffic data stored in a data collection and storage subsystem;

determine, based on the plurality of features for the network traffic data, which ones of the extracted subsets of network traffic data are to be provided to the respective ones of the cyber defense algorithms during execution on at least one computing device of a computing cluster, the computing cluster being coupled to the data collection and storage subsystem;

deliver each of the extracted subsets of the network traffic data from the data collection and storage subsystem to the at least one computing device, such that, during execution of the set of cyber defense algorithms on the at least one computing device, the at least one computing device provides the extracted subsets of the network traffic data to respective ones of the cyber defense algorithms;

receiving an analysis of the network traffic data based upon analyses of the respective extracted subsets of the network traffic data performed by the respective ones of the cyber defense algorithms;

detect, based on the analysis of the network traffic data, centrally-controlled, malware that is currently performing at least one distributed network attack ("botnet attack") from devices within the geographically separate networks;

generate a user interface with a visualization and decision-making subsystem to present an electronic map of geographic locations of source devices and target devices of the at least one botnet attack within the geographically separate networks;

automatically generate, by at least one of the set of cyber defense algorithms, network security policies; and propagate the network security policies to at least one of the geographically separate networks.

* * * * *